US009785063B2

(12) United States Patent
Stolin Roditi et al.

(10) Patent No.: US 9,785,063 B2
(45) Date of Patent: Oct. 10, 2017

(54) LIQUID ELECTROPHOTOGRAPHIC INK (75) Inventors: Stella Stolin Roditi, Rehovot (IL); Swissa Shay, Rehovot (IL); Eyal Bachar, Modiin (IL); Getahun Biadglin, Beth-Shean (IL); Marc Klein, Tel Aviv (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 0 days.

(21) Appl. No.: 14/396,511

(22) PCT Filed: Apr. 27, 2012

(86) PCT No.: PCT/EP2012/057728
§ 371 (c)(1),
(2), (4) Date: Oct. 23, 2014

(87) PCT Pub. No.: WO2013/159820
PCT Pub. Date: Oct. 31, 2013

(65) Prior Publication Data
US 2015/0118448 A1    Apr. 30, 2015

(51) Int. Cl.
| | |
|---|---|
| *G03G 9/00* | (2006.01) |
| *C09D 11/03* | (2014.01) |
| *C09D 11/106* | (2014.01) |
| *C09D 11/033* | (2014.01) |
| *G03G 7/00* | (2006.01) |
| *G03G 9/13* | (2006.01) |
| *G03G 9/135* | (2006.01) |

(52) U.S. Cl.
CPC ............ *G03G 9/00* (2013.01); *C09D 11/033* (2013.01); *C09D 11/106* (2013.01); *G03G 7/00* (2013.01); *G03G 9/131* (2013.01); *G03G 9/135* (2013.01); *Y10T 428/24802* (2015.01)

(58) Field of Classification Search
CPC ....................... C09D 11/00; Y10T 428/24802
See application file for complete search history.

(56) References Cited

U.S. PATENT DOCUMENTS

| | | | |
|---|---|---|---|
| 4,241,159 A | 12/1980 | Priem et al. | |
| 7,291,658 B2 | 11/2007 | Narayan-Sarathy et al. | |
| 7,977,023 B2 | 7/2011 | Roditi et al. | |
| 2009/0029273 A1* | 1/2009 | Roditi ................. | C09D 11/107 430/48 |
| 2011/0091798 A1 | 4/2011 | Victor et al. | |
| 2011/0104441 A1* | 5/2011 | Bhattacharyya ......... | G03G 7/00 428/143 |

(Continued)

FOREIGN PATENT DOCUMENTS

| | | | | |
|---|---|---|---|---|
| CN | 101575397 | | 11/2009 | |
| IL | WO 2009151446 A1 * | | 12/2009 | ........... C09D 11/037 |

(Continued)

*Primary Examiner* — Gerard Higgins
*Assistant Examiner* — Sathavaram I Reddy
(74) *Attorney, Agent, or Firm* — Dierker & Kavanaugh, P.C.

(57) ABSTRACT

The present disclosure discloses a liquid electrophotographic ink. The ink includes a liquid vehicle, an ethylene acid copolymer, and an ethylene/(meth)acrylic acid C1-10 alkyl ester copolymer. Also disclosed is a method for the manufacture that ink and a method for performing a liquid electrophotographic process by printing a substrate with the ink.

12 Claims, 3 Drawing Sheets (56) References Cited

U.S. PATENT DOCUMENTS

2011/0123228 A1  5/2011  Roditi et al.
2011/0242241 A1  10/2011  Chun et al.

FOREIGN PATENT DOCUMENTS

| IL | WO 2011110221 A1 * | 9/2011 | ........... C09D 11/033 |
|----|----|----|----|
| WO | WO 01/64764 | 9/2001 | |
| WO | WO 2007/130069 | 11/2007 | |
| WO | WO 2009/151446 | 12/2009 | |
| WO | WO 2011/003442 | 1/2011 | |
| WO | WO 2012/006047 | 1/2012 | |
| WO | WO 2012/130303 | 10/2012 | |

* cited by examiner

LIQUID ELECTROPHOTOGRAPHIC INK

BACKGROUND

Conventional liquid electrophotographic (LEP) printing processes include applying a liquid ink onto a printing substrate (e.g. paper). Liquid electrophotographic inks may include coloured polymer particles dispersed in a liquid vehicle and may be manufactured by methods in which raw polymer particles dispersed in an amount of liquid vehicle are ground (before and/or after the addition of a colorant) till the achievement of a target median particle size. The present disclosure discloses a liquid electrophotographic ink, a method for the manufacture of that ink and a printed substrate obtainable by using that ink.

DETAILED DESCRIPTION

Figure 1:
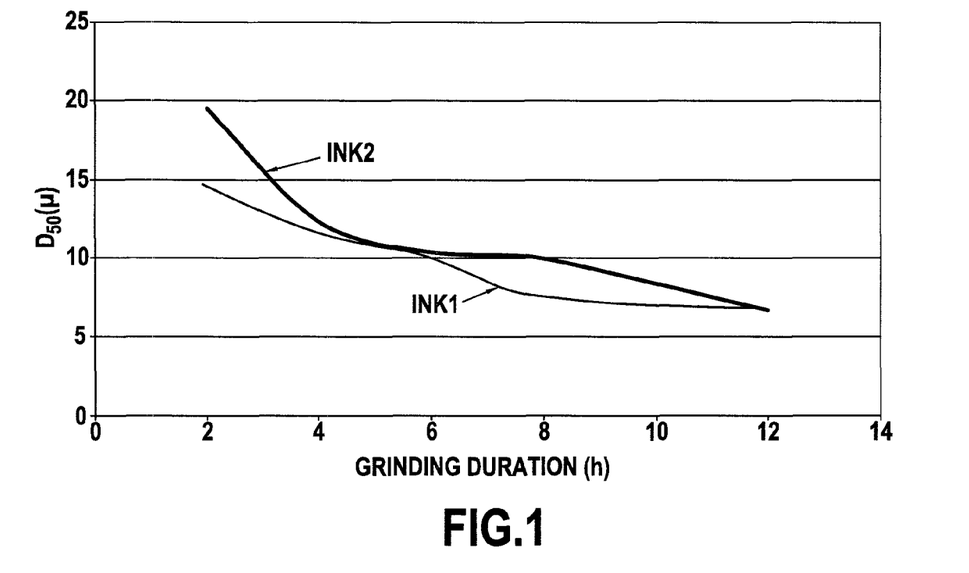
FIG. 1 is a diagram showing the particle size (PS) decrease vs. grinding duration of two black LEP inks. A first ink is as per the present disclosure (ink 1) and includes the polymer mixture of formulation 1 of Example 1. A second ink (ink 2) is a comparative one and includes the polymer mixture of formulation 3 of Example 1. Both inks were ground in the presence of an identical amount of the same liquid vehicle and an identical amount of the same black colorant.
Figure 2:
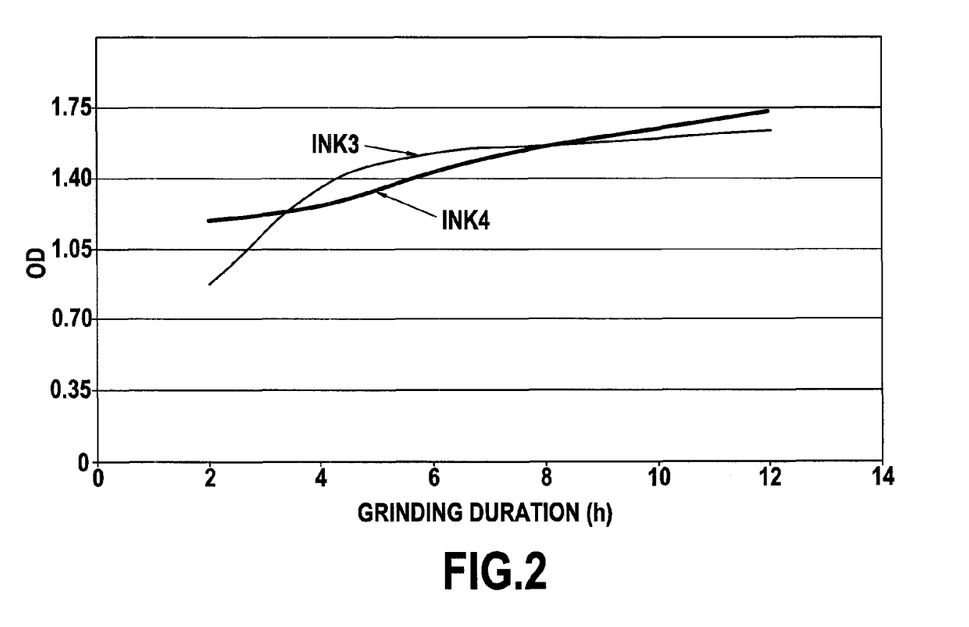
FIG. 2 is a diagram showing optical density (OD) development (Y axis, expressed as Optical Density units) vs. grinding duration of two black LEP inks. A first ink is as per the present disclosure (ink 3) and includes the polymer mixture of formulation 1 of Example 1. A second ink (ink 4) is a comparative one and includes the polymer mixture of formulation 3 of Example 1. Both inks were ground in the presence of an identical amount of the same liquid vehicle and an identical amount of the same black colorant.
Figure 3:
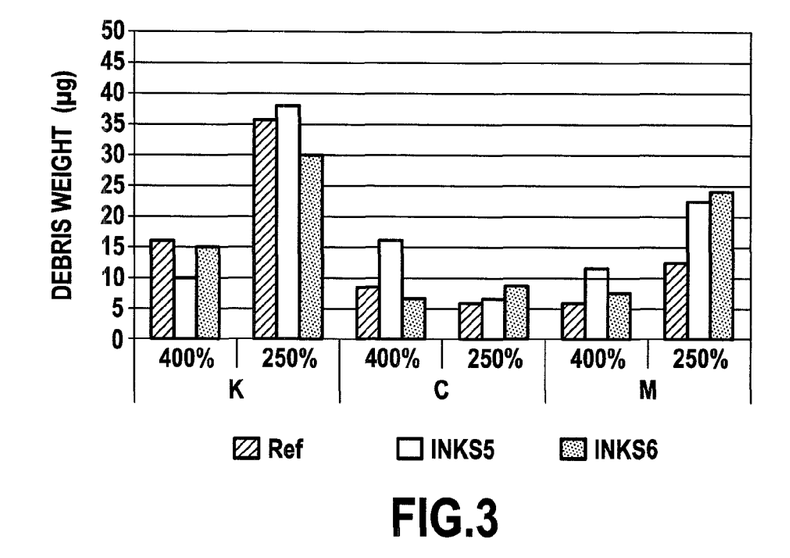
FIG. 3 is a diagram showing the Taber Shear/Scratch resistance results obtained for reference inks and inks obtained as presently disclosed. Y axis represents the debris weight (i.e. ink lost after scratch) in micrograms. X axis represents paper coverage by inks in percent for each K (black), C (cyan), M (magenta) ink. Paper coverage of 250% represents an image thickness of 2.5 micrometers while paper coverage of 400% represents an image thickness of 4 micrometers. The reference inks do not contain any ethylene/(meth)acrylic acid $C_{1-10}$ alkyl ester copolymer; inks 5 contain Elvaloy® AC 12024S in an amount of 10 wt % over the weight of ink solids; inks 6 contain Elvaloy® AC 3427 in an amount of 10 wt % over the weight of ink solids.
Figure 4:
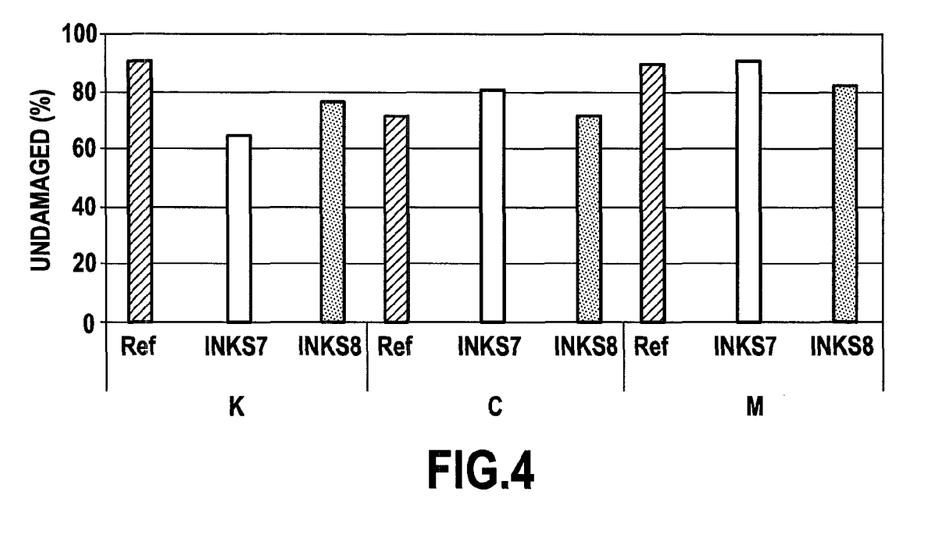
FIG. 4 is a diagram showing the Taber Shear/Scratch resistance results Rub resistance coated paper results obtained for reference inks and inks obtained as presently disclosed. In the X axis, K is black, C is cyan and M is magenta. The reference inks do not contain any ethylene/(meth)acrylic acid $C_{1-10}$ alkyl ester copolymer; inks 7 contain Elvaloy® AC 12024S in an amount of 10 wt % over the weight of ink solids; inks 8 contain Elvaloy® AC 3427 in an amount of 10 wt % over the weight of ink solids.
Figure 5:
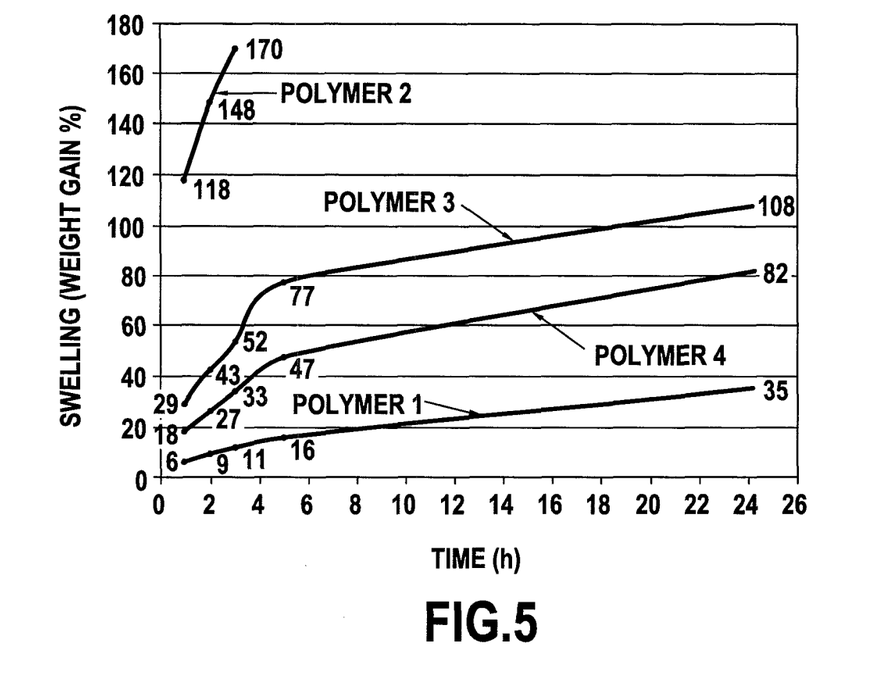
FIG. 5 is a diagram of swelling kinetics over time, at 45° C. for different polymers in Isopar® L. Y axis represents swelling expressed as weight gain % of a sample of a given polymer. Polymer 1 is Bynel®2022, polymer 2 is Elvaloy® AC 3427 polymer 3 is Elvaloy® AC 12024S, polymer 4 is Elvaloy® AC 1820.
Figure 6:
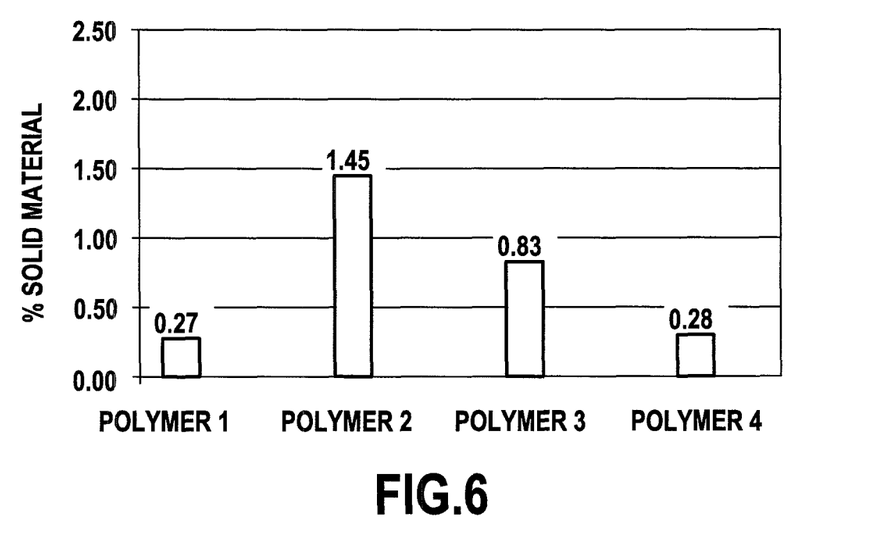
FIG. 6 is a diagram representing the wt % of solid material left after swelling of a given polymer to saturation in Isopar® L. Polymer 1 is Bynel®2022, polymer 2 is Elvaloy® AC 3427 polymer 3 is Elvaloy® AC 12024S, polymer 4 is Elvaloy® AC 1820.

Liquid electrophotographic inks may be manufactured by methods in which a resin (usually a thermoplastic acid polymer) dispersed in a liquid vehicle is ground. The grinding may be performed after a colorant is also added to have coloured ink particles. The grinding step mainly aims to achieve a desired target particle size (PS). Ink PS plays an influence on ink properties. In effect, if PS is larger than required, optical density (OD) and ink particles mobility—which in turn contributes to appropriate ink conductivity and ink viscosity—may be affected. The final result may be an unsatisfactory print quality (also "PQ").

Grinding efficiency may be evaluated by calculating the time (hence energy) necessary in the process to reach desired target ink output properties (such as ink PS and/or ink colour development). Without wanting to be bound by any theory, it is believed that the lower the viscosity of the dispersion to be ground, the higher the grinding efficiency. To decrease the viscosity of the dispersion, significant amounts of liquid vehicle may be added. Liquid vehicles may be hydrocarbon-based as they are preferred due to their volatility and hence fast drying time. However, from a regulatory standpoint the hydrocarbons that may be employed in LEP inks are often classed as volatile organic solvents (also referred to as VOC) which are dangerous to human health or cause harm to the environment. As green trends evolve in the world, levels of these hydrocarbons in LEP inks have thus become a valuable concern. Additionally, the reduction in the amount of liquid vehicles is also desirable to address concerns associated with safety of manufacturing and transportation of LEP inks. In light of these concerns, LEP inks are often subject to a post-manufacturing concentration step to increase the non-volatile solids (NVS) content. The inks can then be re-diluted just before final use. The (expensive) technologies required for ink concentration (such as EPIC® technology or centrifuges), as well the time necessary to complete the step entail further costs. Additionally, existing solutions to concentrate the inks may not be totally satisfactory due e.g. to the technical limits which can hardly lead to highly concentrated inks in industrially acceptable times.

Based on the above, it has been proposed to manufacture LEP inks by avoiding massive use of conventional liquid vehicles. Prior attempts in this sense include the adoption of high temperature grinding profiles (to heat reduce viscosity of the mixtures to be ground), the addition liquid vehicles to resin pastes characterized by high NVS content before grinding according to specific manufacturing protocols, the use of more environmentally friendly (i.e. less VOC-containing) liquid vehicles or the addition of small molecules acting as ink dispersants to lower the viscosity of the mixture to be ground. However, these solutions may not always be satisfactory, may be too energy demanding or may be complex to be carried out.

In the present description and unless otherwise indicated, "ink solids content" and "non-volatile solids" (NVS) are interchangeably used. The ink solids content is expressed as wt % and is calculated as (100−VOC), wherein VOC (volatile organic content) is as defined below. Solids may include (depending on ink composition) at least ethylene acid copolymers, additional polymers that may be combined with the acid copolymer, ethylene/(meth)acrylic acid $C_{1-10}$ alkyl ester copolymers, colorants as well as additional ink ingredients such as charge adjuvants, charge directors, surface modifiers, compatibility additives, charging additives, waxes, biocides, sequestering agents, preservatives, emulsifiers and transfer additives.

In the present description and unless otherwise indicated, volatile organic components (VOC) in a material (e.g. a liquid vehicle or an ink) are calculated according to Test Method 24 of USA Code of Federal Regulations, Title 40: Protection of Environment, Part 60, Annex A-7 year 2011. The method includes taking a 1 g sample of the material to be tested and heat the sample at 110° C. for 1 hour. If no reduction in sample weight is observed, the material contains no VOC. If the entire sample evaporates, the material contains 100 wt % VOC.

In the present description and unless otherwise indicated (meth)acrylic means acrylic and/or methacrylic, preferably acrylic or methacrylic.

In the present description and unless otherwise indicated "copolymer" preferably refers to a polymer that is obtainable from two monomers, while e.g. "terpolymer" preferably refers to a polymer that is obtainable from three monomers. It is intended that terpolymers may also be obtained by chemically modifying copolymers in a post-polymerization step (e.g. salification or esterification of acid groups).

In the present description and unless otherwise indicated, "acidity," "acid number," or "acid value" refers to the mass of potassium hydroxide (KOH) in milligrams that is required to neutralize one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the ink.

In the present description and unless otherwise indicated, "melt viscosity" refers to the ratio of shear stress to shear rate at a given shear stress or shear rate. Testing may be performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity at 140° C. The units can be given in mPa-s or poise. Alternatively, a parallel plate rheometer can be used, such as a commercially available AR-2000 Rheometer from Thermal Analysis Instruments. If the melt viscosity of a particular polymer (or mixture of polymers) is specified, unless otherwise stated, it is the melt viscosity for that polymer (or mixture of polymers) alone, in the absence of any of the other components of the ink, in particular at a 100% solid content.

A certain monomer may be described herein as constituting a certain weight percentage of a polymer. This indicates that the repeating units formed from the said monomer in the polymer (i.e. the monomer in polymerized form) constitute said weight percentage of the polymer.

In the present description and unless otherwise indicated, "electrophotographic printing" or "electrostatic printing" refers to the process that provides an image that is transferred from a photo imaging substrate either directly or indirectly via an intermediate transfer member. As such, the image is not substantially absorbed into the photo imaging substrate on which it is applied. Additionally, "electrophotographic printers" or "electrostatic printers" refer to those printers capable of performing electrophotographic printing, as described above. "Liquid electrophotographic printing" or "liquid electrostatic printing" is a specific type of electrophotographic printing where a liquid ink is employed in the electrophotographic process rather than a powder toner.

In the present description and unless otherwise indicated, $D_{50}$ (aka $d_{50}$) diameter is used to define the ink particle size and size distribution, is expressed in microns and refers to the size in microns that splits the distribution with half above and half below this diameter.

In one aspect, the present disclosure discloses a liquid electrophotographic ink including:
a) a liquid vehicle,
b) an ethylene acid copolymer, and
c) an ethylene/(meth)acrylic acid $C_{1-10}$ alkyl ester copolymer, said copolymer being present in an amount between about 0% by weight (lower limit excluded) and 10% by weight over the weight of ink solids.

The liquid vehicle may act as a dispersing medium for the other components in the ink. For example, the liquid vehicle can be a hydrocarbon, silicone oil, vegetable oil, etc. As such, the liquid vehicle can be a hydrocarbon-based liquid vehicle. The liquid vehicles used for the inks of the present disclosure can be substantially similar to carriers used in prior art liquid electrophotography inks. Such vehicles may include at least one aliphatic hydrocarbon, such as paraffins and isoparaffins. As such, liquid vehicles can include or essentially consist of, isoparaffins, such as or equivalent to the ISOPAR® high-purity isoparaffinic solvents with narrow boiling ranges marketed by Exxon Mobil Corporation (Fairfax, Va., USA). Also suitable as liquid vehicles or components of liquid vehicles for implementing embodiments of the present disclosure are alkanes having from about 6 to about 14 carbon atoms such as solvents sold under the NORPAR® (NORPAR® 12, 13 and 15) trade name available from Exxon Mobil Corporation (Fairfax, Va., USA). Other hydrocarbons for use as liquid vehicles or vehicle components are sold under the AMSCO® (AMSCO® 460 and OMS) trade name available from American Mineral Spirits Company (New York, N.Y., USA), under the SOL-TROL® trade name available from Chevron Phillips Chemical Company LLC (The Woodlands, Tex., USA) and under the SHELLSOL® trade name available from Shell Chemicals Limited (London, UK). Such liquid vehicles and vehicle components have desirable properties such as low odor, lack of color, selective solvency, good oxidation stability, low electrical conductivity, low skin irritation, low surface tension, superior spreadability, narrow boiling point range, non-corrosive to metals, low freeze point, high electrical resistivity, high interfacial tension, low latent heat of vaporization and low photochemical reactivity. Also suitable as liquid vehicles or components of liquid vehicles for implementing embodiments of the present disclosure are aromatic and/or aliphatic hydrocarbons having a resistivity in excess of about $10^9$ ohm-cm and a dielectric constant below about 3.0.

The liquid vehicle may be present between about 20% and 95% by weight, for example between about 30% or 40% and 90%, or 85% or 80% by weight over the weight of the ink, the rest of the ink being solids. For example, an ink as presently disclosed may have an ink solids content between about 1.5% and 5% by weight (i.e. liquid vehicle content between about 95% and 98.5%). This ink solids content is particularly suitable for a ready-to-use ink. Alternatively, an ink as presently disclosed may have an ink solids content between about 15% and 70% by weight (i.e. liquid vehicle content between about 30% and 85%). This ink solids content is particularly suitable for stocking and/or transportation of the ink.

Suitable as ethylene acid copolymers for implementing embodiments of the present disclosure are copolymers having an acid number between about 70 and 130, for example more than 74 and less than 124 such as 74, 76, 105, 115 or 124 mg KOH/g of polymer when measured according to method ASTM D1386.

Suitable as ethylene acid copolymers for implementing embodiments of the present disclosure are thermoplastic ethylene acid copolymers.

Suitable as ethylene acid copolymers for implementing embodiments of the present disclosure are copolymers including ethylene and acrylic and/or methacrylic acid monomers, wherein the amount of the acid monomers is included between about 10% and 25% by weight, for example between about 10% or 15% and 20% by weight, such as equal to about 10%, 15% or 18% by weight over the weight of the copolymer. These copolymers are obtainable by copolymerizing ethylene with an acid monomer selected from acrylic and/or methacrylic acid.

Suitable ethylene acid copolymers are commercially available. For example they include the Nucrel family of ethylene/(meth)acrylic acid copolymers (e.g. NUCREL® 925, NUCREL® 2906, NUCREL® 2806, NUCREL® 699, NUCREL® 599, or NUCREL® 960).

For example, a suitable ethylene acid copolymer is a combination of NUCREL® 925 (copolymer of ethylene and methacrylic acid, made with nominally 15 wt % methacrylic acid and a melt flow rate (190° C./2.16 kg) of 25 g/10 min when measured with ASTM D1238) or NUCREL® 960 (copolymer of ethylene and methacrylic acid, made with nominally 15 wt % methacrylic acid and a melt flow rate (190° C./2.16 kg) 60 g/10 min ASTM D1238) and NUCREL® 2806 (copolymer of ethylene and acrylic acid, made with nominally 18 wt % acrylic acid and a melt flow rate (190° C./2.16 kg) 60 g/10 min when measured with ASTM D1238).

The ethylene/(meth)acrylic acid $C_{1-10}$ alkyl ester copolymer may refer to a polymer obtainable by copolymerizing ethylene and (meth)acrylic acid $C_{1-10}$ alkyl ester monomers. For example, the copolymer may be an ethylene-co-acrylic acid $C_{1-10}$ alkyl ester polymer or an ethylene-co-methacrylic acid $C_{1-10}$ alkyl ester polymer. In one embodiment, the ethylene/(meth)acrylic acid $C_{1-10}$ alkyl ester copolymer does not include any one of the following monomers: styrene, butadiene, vinyltoluene, 2-hydroxyethylmethacrylate.

Suitable as ethylene/(meth)acrylic acid $C_{1-10}$ alkyl ester copolymers for implementing embodiments of the present disclosure are copolymers in which the $C_{1-10}$ alkyl ester is for example a $C_{1-6}$ alkyl ester or $C_{1-4}$ alkyl ester, such as methyl or butyl, preferably butyl. Mixtures of alkyl isomers are also possible. For example, when the alkyl is butyl, it can be any one of normal, iso- and/or tert-butyl.

A suitable ethylene/(meth)acrylic acid $C_{1-10}$ alkyl ester copolymer for implementing embodiments of the present disclosure has an average molecular weight between 10 k and 100 k Dalton. For examples, a suitable copolymer is an ethylene/(meth)acrylic acid $C_{1-4}$ alkyl ester copolymer having an average molecular weight between 10 k and 100 k Dalton.

Suitable copolymers may be selected from the group consisting of (i) an ethylene/methyl acrylate copolymer wherein the methyl acrylate is present in an amount of 20% by weight over the weight of the copolymer, (ii) an ethylene/methyl acrylate copolymer wherein the methyl acrylate is present in an amount of 24% by weight over the weight of the copolymer, (iii) an ethylene/butyl acrylate copolymer wherein the butyl acrylate is present in an amount of 27% by weight over the weight of the copolymer, and (iv) mixtures thereof.

Suitable commercially available copolymers are for example Elvaloy® AC 1820 (ethylene-co-methyl acrylate containing 20% by weight of methyl acrylate), Elvaloy® AC 12024S (mixture of an ethylene-co-methyl acrylate containing 24% by weight of methyl acrylate and antioxidant additives) and Elvaloy® AC 3427 (ethylene-co-butyl acrylate containing 27% by weight of methyl acrylate), all available from DuPont™.

The ethylene/(meth)acrylic acid $C_{1-10}$ alkyl ester copolymer may be present in an amount between about 5% and 10%, upper and lower limits included, by weight over the weight of ink solids. For example, the ethylene/(meth)acrylic acid $C_{1-10}$ alkyl ester copolymer may be present in an amount between about 5% or 6%, or 7%, or 8%, or 9% and 10% by weight over the weight of ink solids. For example the ethylene/(meth)acrylic acid $C_{1-10}$ alkyl ester copolymer is ethylene-co-butyl acrylate and is present in an amount of about 10% by weight over the weight of ink solids.

In one example:
  the ethylene acid copolymer includes, more preferably it essentially consists of, an ethylene/(meth)acrylic acid copolymer, and
  the ethylene/(meth)acrylic acid $C_{1-10}$ alkyl ester copolymer is an ethylene/(meth)acrylic acid $C_{1-4}$ alkyl ester, such as methyl or butyl ester, preferably it includes, more preferably it essentially consists of, an ethylene-co-butyl acrylate.

The combined amount of an ethylene acid copolymer and an ethylene/(meth)acrylic acid $C_1$ alkyl ester copolymer as presently defined may constitute between 1% and 100%, for example between about 50% and 90% or between about 70% and 90% by weight over the weight of ink solids.

Suitable polymer mixtures of an ethylene acid copolymer and an ethylene/(meth)acrylic acid $C_{1-10}$ alkyl ester copolymer display a melt viscosity between about $10^4$ and $5 \times 10^6$, such as 60,000 and 200,000 poise. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate. Melt viscosity may be measured on mixtures containing 100% solids.

The ink presently disclosed may include a mixture of:
  NUCREL® 925 and/or NUCREL® 960 (their chemical definition is provided above) in an amount between about 50% and 80% by weight over the weight of ink solids,
  NUCREL® 2806 (its chemical definition is provided above) level can range in an amount between about 5% and 20% by weight over the weight of ink solids, and
  Elvaloy® AC 3427 (its chemical definition is provided above) level can range in an amount between about 0% by weight (lower limit excluded) and 10% by weight over the weight of ink solids.

The liquid electrophotographic ink as presently disclosed may include a colorant. The colorants can include, but are not limited to, cyan colorants, magenta colorants, yellow colorants, violet colorants, orange colorants, green colorants, black colorants, and combinations thereof. The colorant may be dispersed in the liquid vehicle and can be any colorant compatible with the liquid vehicle and useful for electrophotographic or electrostatic printing. For example, the colorant may be present as colorant particles, or may include a resin (in addition to the acid polymer and copolymer described herein) and a colorant. The resins and colorants can be any of those commonly used. For example, colorants by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; colorants by Sun Chemical including L74-1357 Yellow, L75-1331 Yellow, L75-2337 Yellow; colorants by Heubach including DALAMAR® YELLOW YT-858-D; colorants by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; colorants by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; colorants by Mobay including QUINDO® MAGENTA, INDOFAST® BRILLIANT SCARLET, QUINDO® RED 6700, QUINDO® RED 6713, INDOFAST® VIOLET; colorants by Cabot including Maroon B STERLING® NS BLACK, STERLING® NSX 76, MOGUL® L; colorants by DuPont including TIPURE® R-101; and colorants by Paul Uhlich including UHLICH® BK 8200.

The colorant may be present in an amount between about 0.1% and 60%, such as between about 1% or 5% or 10% and 60% or 50% or 25% by weight over the weight of ink solids. For example, the colorant may be present in an amount between about 10% and 25% by weight over the weight of ink solids.

The liquid electrophotographic ink as presently disclosed may include any one of the following ingredients: a charge adjuvant, a charge director, a surface modifier, compatibility additives, charging additives, a wax, a biocide, a sequestering agent, a preservative, an emulsifier, transfer additives and mixtures thereof.

The charge director may be added to the carrier liquid in order to maintain sufficient electrostatic charge on the ink particles. The charge director can include, but is not limited to, lecithin, oil-soluble petroleum sulfonates (e.g. neutral Calcium Petronate™, neutral Barium Petronate™, and basic Barium Petronate™), polybutylene succinimides (e.g., OLOA™1200 and Amoco 575), and glyceride salts (e.g., sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates. Also, charge director compounds may be other ionic compounds, particularly metal salts of fatty acids, metal salts of sulfosuccinates, metal salts of oxyphosphates, metal salts of alkyl-benzenesulfonic acid, metal salts of aromatic carboxylic acids as well as zwitterionic and non-ionic compounds, such as polyoxyethylated alkylamines, lecithin, polyvinylpyrrolidone, organic acid esters of polyvalent alcohols.

The charge director may be present in an amount between about 0.1 and 1% by weight over the weight of ink solids.

The charge adjuvant can include, but is not limited to cobalt salts of naphthenic acid, calcium salts of naphthenic acid, copper salts of naphthenic acid, manganese salts of naphthenic acid, nickel salts of naphthenic acid, zinc salts of naphthenic acid, iron salts of naphthenic acid, barium salts of stearic acid, cobalt salts of stearic acid, lead salts of stearic acid, zinc salts of stearic acid, aluminium salts of stearic acid, zinc salts of stearic acid, copper salts of stearic acid, lead salts of stearic acid, iron salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. For example, the charge adjuvant is aluminum tristearate.

The charge adjuvant may be present in an amount from about 0.1% to 5%, e.g. from about 0.5% to 4%, or from about 1% to 3% by weight over the weight of ink solids.

The ink presently disclosed may have a viscosity of less than 50 cps, preferably less than 20 cps, more preferably between 2 and 10 cps, when measured at a temperature of 25° C., a shear rate of 11 Hz and at an ink solids content between 5% and 30% by weight over the weight of the ink. A suitable apparatus to measure viscosity is a commercially available AR-2000 rheometer from Thermal Analysis Instruments. The viscosity is measured in parallel plates mode, using spindle of 40 mm diameter and 500 micrometers gap adopting the temperature, shear rate and ink solids conditions as above.

The ethylene acid copolymer and the ethylene/(meth) acrylic acid $C_{1-10}$ alkyl ester copolymer may form polymer particles having a $D_{50}$ diameter between about 3 and 9, preferably between about 5 and 7 microns. The particles may also include a colorant.

In one aspect, the present disclosure discloses a method for the manufacture of a liquid electrophotographic ink as defined above, said method including a step of mixing:
 a) a liquid vehicle,
 b) an ethylene acid copolymer, and
 c) an ethylene/(meth)acrylic acid $C_{1-10}$ alkyl ester copolymer, said copolymer being present in an amount between about 0% by weight (lower limit excluded) and 10% by weight over the weight of ink solids.

The method may include the steps of:
i) forming ink particles by mixing an ethylene acid copolymer with an ethylene/(meth)acrylic acid $C_{1-10}$ alkyl ester copolymer, said copolymer being present in an amount as presently disclosed, in the presence of a liquid vehicle,
ii) grinding the particles obtained in step a) till the achievement of a desired particle size.

Step ii) of grinding may include adding a second amount of liquid vehicle before or during grinding.

It is known that process conditions to perform step ii) of grinding may be adjusted depending on the specific colorant. In general terms, step ii) of grinding may be performed for example for a time between about 1 and 20 hours, for example between about 1 and 15 hours, for example between 10 and 15 hours. Step ii) of grinding can be performed using a single or step temperature profile. For example, temperature may not be higher than about 50° C., such as not higher than 45° C.

If a colorant is desired, it may be added either in step i) or step ii), preferably step ii).

If the presence of a charge adjuvant, a charge director, a surface modifier, compatibility additives, charging additives, a wax, a biocide, a sequestering agent, a preservative, an emulsifier or transfer additives is desired, these ingredients may be added in step ii).

In one aspect, the present disclosure discloses a printed substrate which is obtainable by applying a liquid electrophotographic ink as defined above on a printing substrate. The liquid electrophotographic ink can be applied onto the substrate by means of e.g. a LEP apparatus.

The printed substrate may include a printing substrate having an image-receiving surface, and an image printed on said surface, the image including an ethylene acid copolymer, an ethylene/(meth)acrylic acid $C_{1-10}$ alkyl ester copolymer. The image may further include a colorant. In one example, the image has an optical density which for black is preferably 1.75±0.05; for cyan is preferably 1.45±0.05, for magenta is preferably 1.45±0.05, and for yellow is preferably 1.05±0.0 The substrate can be printed by using e.g. a LEP apparatus and an ink as presently disclosed.

In one aspect, the present disclosure discloses the use of an ethylene/(meth)acrylic acid $C_{1-10}$ alkyl ester copolymer as defined above to reduce the viscosity of a liquid electrophotographic ink, said ink further including a liquid vehicle and an acid polymer, both as defined above.

The addition of an ethylene/(meth)acrylic acid $C_{1-10}$ alkyl ester copolymer to an acid polymer and a liquid vehicle, all as defined in the present disclosure, has been found to lead to multiple and distinct advantages in terms of e.g. ink manufacturing, image printing and printed image quality. For example, the addition of an ethylene/(meth)acrylic acid $C_{1-10}$ alkyl ester copolymer to an acid polymer and a liquid vehicle, all as defined in the present disclosure, has been found to lead to a drastic reduction of the viscosity of the resulting mixture. Accordingly, it is possible to achieve a given viscosity by using significantly lower amounts of liquid vehicle and/or with more economically effective grinding temperature profiles. This allows for grinding the ink to target particle size in a shorter time and with less energy, hence achieving an increased grinding efficiency. Also, reducing the grinding time and energy entails preserving the grinding equipment as supported by the reduced amount of metal content in the ink ground according to the present disclosure. Also, the reduction in viscosity allows for grinding inks containing a significantly increased amount of non-volatile solids (NVS) as the viscosity of these inks does not exceed the technical specifications required by existing grinding devices. This translates into an increased grinding productivity (up to and over 160%) measured as amount of ink ground per time unit. The possibility to use lower amounts of liquid vehicle makes it superfluous to perform complex and expensive ink concentration steps. Also, ink concentrations higher than those that may be achieved with existing concentration techniques can be obtained. For example inks having an NVS content of up to and higher than 60% by weight over the weight of the ink can be obtained whereas values of greater than 40% w/w were considered not to be achievable in industrially acceptable times. Finally, it has been found that the use of an ethylene/(meth)acrylic acid $C_{1-10}$ alkyl ester copolymer as presently disclosed does not affect ink properties (such as optical density or printing quality) or printing apparatus. The addition of an ethylene/(meth)acrylic acid $C_{1-10}$ alkyl ester copolymer to an acid polymer and a liquid vehicle, all as defined in the present disclosure, has also been found to improve ink transfer properties in electrostatic printing processes compared to LEP inks that do not contain it. While not being bound by theory, it is believed that the presence of the copolymer increases the compatibility of the acid polymer vs. the liquid carrier, producing a swollen mixture which contains more liquid carrier per given amount of acid polymer. The ink also retains the carrier for a longer time during the printing process. These advantages improve the ink flow properties which in turn have a positive effect for example in a process in which the ink is transferred to a photoconductive surface, and then to an intermediate transfer member, and from the intermediate transfer member to a print substrate, such as paper. These advantages also account for a more moderate ink phase separation, and allows the ink to gradually conform to the surface of the printing media. Accordingly, during the printing process, the acid polymer-containing ink exhibits improved flow, while, after printing (and liquid carrier evaporation), a durable image is created. In addition, the high image-paper conformability allowed by increased ink flow is reflected on image adhesion benefits, in particular on uncoated media.

As supported by the examples of the present application, the inks containing an ethylene/(meth)acrylic acid $C_{1-10}$ alkyl ester copolymer as defined in the present disclosure display advantageous over inks that do not contain them, such as mixtures of acid polymers and ethylene/(meth)acrylic acid/(meth)acrylic acid ester terpolymers.

Further embodiments and advantages will become apparent to a skilled reader in light of the examples provided below.

EXAMPLES

Unless otherwise indicated, the parameters and values mentioned in the present disclosure are measured according to the following procedures.

Method Used to Obtain the Swelling Kinetics Results 1 gr of solid polymer material, is weighed in a glass vial, 10 g of swelling liquid (for example Isopar® L oil) is added. The vial is closed and inserted into an oven at 45° C. Weight gain to the solid sample to saturation is monitored after: 5, 24, 48, 96 and 168 hours (1 week). By cooling the sample to 25° C., gently wiping oil residues on the surface by fiberless PES cloth and drying with air gun, weighing the sample subsequently.

Method Used to Obtain the Solubility after 1 Week Swelling Results

The supernatant from the end of swelling test described above is measured for NVS % in standard moisture analyzing equipment such as SartoriusMA35 or Computrac by Arizona Instruments. The amount of solids detected is reported as solubility.

Taber Shear Tester Method Description

Scratch resistance is measured by the difference in the amount of the ink lost after a scratch resistance test using a Taber Shear/Scratch Tester, Model 551, and Mettler Toledo Microbalance, Model MT/UMT.

Method Used to Obtain the Rub Resistance Coated Paper Results

Significance and Use

This test method can be used to evaluate the relative rub resistance of printed inks, coatings, and substrates.

1. Essence of the method:
  1.1 The test specimen is exposed to mechanical abrasion at well-defined conditions
  1.2 The degree of the damage caused by the abrasion is assessed by optical measurement
This test method is based on the following standard: ASTM D 5264-92
2. Apparatus
  2.1 Sutherland Rub Tester
  2.2 GretagMachbeth ColorEye XTH spherical spectrometer.
3. Recommended parameters
  3.1 Method—lapping film 3 micron
    3.1.1 Temperature: 23+/−1 C
    3.1.2 Relative humidity: 50+/−2
    3.1.3 Test Block: Flat 4 pounds
    3.1.4 Speed: 2 (High)
    3.1.5 Rubbing direction: perpendicular to the machine direction of the printing
    3.1.6 Receptor: 3M Imperial Lapping Film, Grade: 3 microns
    3.1.7 Number of strokes: 100
4 Evaluation and Scaling The degree of the damage caused by the abrasion is assessed by optical measurement, namely by measuring the ink strength between the damaged surfaces, relative to the intact surface. The degree of the damage is expressed by the amount of the erased ink calculated according to the following formula: Erased amount=100−Trial Strength.

Method was Used to Measure Particle Size

Particle size test is performed using a Malvern® Masterizer 2000. The device measures the virtual perimeter of the tested material particles according to Mie scattering principle. The particle sizes are expressed in values of relative volume Method Used to Calculate the OD OD may be measured by using a spectrodensitometer (e.g. X-Rite 939) having the following parameters:
Receiver: Blue enhanced silicon photodiodes
Light source: Gas-filled tungsten lamp, approx. 2856° K (corrected for D65 illuminant)
Illuminant types: A, C, D50, D65, D75, F2, F7, F11, & F12
Standard observers: 2° & 10°.

OD is measured in arbitrary units. One way to calculate optical density is the natural log method using the formula: OD=A=log (I0/I). Here A is the absorbance, log is the base-10 log, I0 is the incident light intensity used to, and I is the transmitted light intensity. This is the most widely used method of calculating absorbance or optical density.

Example 1

The viscosity of the following inks was calculated:

| No. | Polymer Formulation | Colorant | % solids | Viscosity (CP) | Remark |
|---|---|---|---|---|---|
| 1 | A:B:C 72:18:10 | Black | 8.4 | 4 | |
| 2 | A:B:C 72:18:10 | Black | 8.4 | 2 | |
| 3 | A:B:D 72:18:10 | Black | 8.4 | 150 | comparative |
| 4 | A:B:D 72:18:10 | Black | 8.4 | 90 | comparative |
| 5 | A:B:C 72:18:10 | Magenta | 8.4 | 1 | |
| 6 | A:B:D 72:18:10 | Magenta | 8.4 | 145 | comparative |
| 7 | A:B:C 72:18:10 | Cyan | 8.4 | 3 | |
| 8 | A:B:D 72:18:10 | Cyan | 8.4 | 120 | comparative |

A is Nucrel®925 which is a copolymer of ethylene and methacrylic acid, made with nominally 15 wt % of methacrylic acid (from DuPont); B is Nucrel®2806 which is copolymer of ethylene/acrylic acid (18 wt %) (from DuPont); C is Elvaloy®AC3427 which is an ethylene-co-butyl acrylate (27 wt %) (from DuPont); D is Bynel®2022 which is terpolymer of ethylene/methacrylic acid (10 wr/o)/isobutyl acrylate (10 wt %) (from DuPont).

Ink formulations 1-2 and 3-4 are identical and were done in double to confirm the result.

The following general procedure may be followed to prepare the inks according to the present disclosure:

First, a resin paste was obtained by mixing a desired amount of a mixture of various grades of polyethylene-methacrylic acid copolymers (e.g. NUCREL® 960, DuPont; A-C® 5180, Honeywell; NUCREL® 699, DuPont) with the desired amount of an an ethylene/(meth)acrylic acid $C_{1-10}$ alkyl ester copolymer and a desired amount of a liquid vehicle (e.g. ISOPAR® L which is an isoparaffinic oil manufactured by Exxon). The mixing was done in a Ross double planetary mixer at a speed of 60 rpm and a temperature of 130° C. for one hour. The temperature was then reduced and the mixing was continued until the mixture reached room temperature. During mixing, the polymers solvated in ISOPAR® L, and during cooling, granules of polymer mixture (with solvated carrier liquid) in carrier liquid were obtained. Second, part of the mixture produced in the first step was charged into a Union Process 1S ball attritor together with a colorant, and a second amount of ISOPAR® L. In addition, a charge adjuvant and other particulate additives were added in desired amounts. The mixture was ground for 12 hours at 45° C., until obtaining an ink concentrate including a dispersion of ink particles incorporating the polymers and the colorant. Finally and when a ready-to-use ink was desired, the ink concentrate was diluted with additional ISOPAR® L to produce inks having a 2% to 3% wt % solid content and charged utilizing 6 mg/gram solids of a charge director.

The invention claimed is:

1. A liquid electrophotographic ink, comprising:
  a liquid vehicle; and
  a polymer mixture consisting of:
    a combination of ethylene acid copolymers consisting of:
      i) a copolymer of ethylene and methacrylic acid made with nominally 15 wt % methacrylic acid and having a melt flow rate of 25 g/10 min and a copolymer of ethylene and acrylic acid, made with nominally 18 wt % acrylic acid and a melt flow rate (190° C./2.16 kg) 60 g/10 min; or
      ii) a copolymer of ethylene and methacrylic acid made with nominally 15 wt % methacrylic acid and having a melt flow rate of 60 g/10 min and a copolymer of ethylene and acrylic acid, made with nominally 18 wt % acrylic acid and a melt flow rate (190° C./2.16 kg) 60 g/10 min; and an ethylene/(meth)acrylic acid $C_{1-10}$ alkyl ester copolymer selected from the group consisting of an ethylene/methyl acrylate copolymer and an ethylene/butyl acrylate copolymer, said ethylene/(meth)acrylic acid $C_{1-10}$ alkyl ester copolymer being present in an amount greater than 0% by weight to 10% by weight of ink solids.

2. The liquid electrophotographic ink according to claim 1, further comprising a colorant.

3. The liquid electrophotographic ink according to claim 1, further comprising an ingredient selected from the group consisting of: a charge adjuvant, a charge director, a surface modifier, compatibility additives, charging additives, a wax, a biocide, a sequestering agent, a preservative, an emulsifier, transfer additives, and mixtures thereof.

4. A liquid electrophotographic ink, comprising:
a liquid vehicle; and
a polymer mixture consisting of:
 a combination of ethylene acid copolymers consisting of a combination of a copolymer of ethylene and methacrylic acid made with nominally 15 wt % methacrylic acid and having a melt flow rate of 25 g/10 min and a copolymer of ethylene and acrylic acid, made with nominally 18 wt % acrylic acid and a melt flow rate (190° C./2.16 kg) 60 g/10 min; and
 an ethylene/butyl acrylate copolymer in an amount of about 10% by weight of ink solids;
wherein the ink has a viscosity ranging from about 1 CP to about 4 CP and an ink solids content of about 8.4% by weight of the ink.

5. The liquid electrophotographic ink according to claim 4, further comprising a colorant.

6. The liquid electrophotographic ink according to claim 4, wherein
the butyl acrylate is present in an amount of 27% by weight of the ethylene/butyl acrylate copolymer.

7. The liquid electrophotographic ink according to claim 4, further comprising an ingredient selected from the group consisting of: a charge adjuvant, a charge director, a surface modifier, compatibility additives, charging additives, a wax, a biocide, a sequestering agent, a preservative, an emulsifier, transfer additives, and mixtures thereof.

8. A method for making the liquid electrophotographic ink according to claim 1, said method comprising:
mixing the liquid vehicle and the combination of ethylene acid copolymers to form the ink; and
adding the ethylene/(meth)acrylic acid $C_{1-10}$ alkyl ester copolymer to the ink to reduce a viscosity of the ink to less than 50 cps, when measured at a temperature of 25° C., a shear rate of 11 Hz, and at an ink solids content between 5% and 30% by weight of the ink, wherein said ethylene/(meth)acrylic acid $C_{1-10}$ alkyl ester copolymer is present in an amount greater than 0% by weight to 10% by weight of ink solids.

9. The method according to claim 8 wherein the mixing of the ethylene acid copolymer with the ethylene/(meth)acrylic acid $C_{1-10}$ alkyl ester copolymer in the presence of the liquid vehicle forms ink particles, and wherein the method further comprises:
grinding the particles for an amount of time sufficient to achieve a desired particle size.

10. A printed substrate which is obtainable by applying the liquid electrophotographic ink as defined in claim 1 on a printing substrate.

11. A method for reducing a viscosity of a liquid electrophotographic ink, said liquid electrophotographic ink comprising a liquid vehicle and a combination of ethylene acid copolymers consisting of i) a combination of a copolymer of ethylene and methacrylic acid made with nominally 15 wt % methacrylic acid and having a melt flow rate of 25 g/10 min and a copolymer of ethylene and acrylic acid, made with nominally 18 wt % acrylic acid and a melt flow rate (190° C./2.16 kg) 60 g/10 min; or ii) a combination of a copolymer of ethylene and methacrylic acid made with nominally 15 wt % methacrylic acid and having a melt flow rate of 60 g/10 min and a copolymer of ethylene and acrylic acid, made with nominally 18 wt % acrylic acid and a melt flow rate (190° C./2.16 kg) 60 g/10 min, the method consisting of adding an ethylene/(meth)acrylic acid $C_{1-10}$ alkyl ester copolymer to the liquid vehicle and the combination of ethylene acid copolymers, the ethylene/(meth)acrylic acid $C_{1-10}$ alkyl ester copolymer selected from the group consisting of an ethylene/methyl acrylate copolymer and an ethylene/butyl acrylate copolymer, said ethylene/(meth)acrylic acid $C_{1-10}$ alkyl ester copolymer being present in an amount greater than 0% by weight to 10% by weight of ink solids.

12. The method according to claim 11 wherein the ethylene/(meth)acrylic acid $C_{1-10}$ alkyl ester copolymer is selected from the group consisting of:
the ethylene/methyl acrylate copolymer wherein the methyl acrylate is present in an amount of 20% by weight of the copolymer;
the ethylene/methyl acrylate copolymer wherein the methyl acrylate is present in an amount of 24% by weight of the copolymer;
the ethylene/butyl acrylate copolymer wherein the butyl acrylate is present in an amount of 27% by weight of the copolymer; and
mixtures thereof.

* * * * *